United States Patent [19]

Hanada et al.

[11] Patent Number: 4,594,134

[45] Date of Patent: Jun. 10, 1986

[54] METHOD FOR PREPARING A SPHERICAL CURED POLYMER OR A COMPOSITION THEREOF CONTAINING LINEAR ORGANOPOLYSILOXANE BLOCKS

[75] Inventors: Tsuneo Hanada; Yoshitsugu Morita, both of Ichihara, Japan

[73] Assignee: Toray Silicone Company, Limited, Tokyo, Japan

[21] Appl. No.: 670,369

[22] Filed: Nov. 9, 1984

Related U.S. Application Data

[63] Continuation-in-part of Ser. No. 538,796, Oct. 4, 1983, abandoned.

[30] Foreign Application Priority Data

Oct. 12, 1982 [JP] Japan ................. 57-179390

[51] Int. Cl.$^4$ ............................. C08F 2/46
[52] U.S. Cl. ..................... 522/99; 525/476; 525/446; 525/100; 528/901; 528/34; 528/24; 528/18; 528/17; 528/15
[58] Field of Search ........ 525/476, 446, 100; 204/159.13; 528/24, 34, 901, 15, 17, 18

[56] References Cited

U.S. PATENT DOCUMENTS

| | | | |
|---|---|---|---|
| 3,842,141 | 10/1974 | Fetscher et al. | 525/476 |
| 3,843,577 | 10/1974 | Keil | 525/476 |
| 4,370,160 | 1/1983 | Ziemelis | 524/862 |

Primary Examiner—Melvyn I. Marquis
Attorney, Agent, or Firm—Scully, Scott, Murphy & Presser

[57] ABSTRACT

Provided is a method for preparing a spherical cured product having a diameter of 5 mm or less of a polymer or a polymer composition containing at least 10 wt % of the linear organopolysiloxane blocks represented by the following general formula (1), characterized by curing in an atomized state a curable polymer or a curable polymer composition containing at least 10 wt % of the linear organopolysiloxane blocks represented by the following general formula (1):

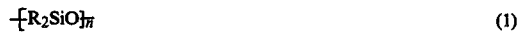

(1)

wherein R's are the same or different monovalent hydrocarbon groups and n is an integer of 5 or more.

11 Claims, No Drawings

METHOD FOR PREPARING A SPHERICAL CURED POLYMER OR A COMPOSITION THEREOF CONTAINING LINEAR ORGANOPOLYSILOXANE BLOCKS

This is a continuation-in-part of U.S. patent application Ser. No. 538,796 filed Oct. 4, 1983, now abandoned.

BACKGROUND OF THE INVENTION

This invention relates to a spherical cured product of a polymer or polymer composition containing linear organopolysiloxane blocks and a method for its preparation.

Organopolysiloxane has wide applications in various forms such as oil, rubber or resin for its characteristic properties such as excellent heat resistance, cold resistance, weathering resistance, mold release characteristics, water repellency, electrical characteristics and flame retardancy. The field of its application has further been widened by its combined use with various organic or inorganic materials. Organopolysiloxane powder is one of such products. The organopolysiloxane powders heretofore known include, for example, a powder prepared by grinding silicone rubber, a methylpolysilsesquioxane powder, a polysiloxane powder consisting of $CH_3SiO_{3/2}$ units and $CH_3HSiO$ units, and a polysiloxane powder consisting of $CH_3SiO_{3/2}$ units, $CH_3HSiO$ units and $SiO_{4/2}$ units (refer to U.S. Pat. No. 3,086,953). The powder prepared by grinding silicone rubber corresponds to a cured product of a polymer composition containing linear organopolysiloxane blocks. Heretofore, the powdering of silicone rubber has been done by grinding it at a normal temperature or after freezing with dry ice, or by processing it in a grinder. When these conventional methods are employed, however, not only their productivity is poor but it is difficult to obtain a powder of small enough particle diameters. Further, the silicone rubber powder thus produced is attended by such problems that it is amorphous in shape, is high in cohesiveness and poor in dispersibility, and is low in lubricity. Therefore, it has had no application to practical use. Methylpolysilsesquioxane powder, polysiloxane powder consisting of $CH_3SiO_{3/2}$ units and $CH_3SiO$ units, or polysiloxane powder consisting of $CH_3SiO_{3/2}$ units, $CH_3HSiO$ units and $SiO_{4/2}$ units is prepared by hydrolyzing the corresponding chlorosilane or alkoxysilane and washing the hydrolyzate with water, then drying and grinding it, but the resulting powders are still attended by the same problems as in the case of the silicone rubber powder. Moreover, these products are attended by another problem that they contain no linear organopolysiloxane blocks so that when they are incorporated in an elastomeric substance, the resulting addition product will become too hard. Such being the case, these polysiloxane powders have had no particular applications other than being used as an oil absorbent or being added to mortar or gypsum with an intent to impart water repellency.

Besides these, the powder prepared by pulverizing a silicone resin and an organic filler together is also attended by similar problems (refer to Japanese Patent Laid Open No. 146434/1977).

In U.S. Pat. No. 4,370,160 there is disclosed a method in which a UV-curable organopolysiloxane composition is irradiated with ultraviolet ray while being dispersed in water or the like to produce a cured powder of organopolysiloxane. But, this method is troublesome and causes an increase of cost because it requires filtration, washing and drying.

SUMMARY OF THE INVENTION

An object of this invention is to solve the aforementioned problems which have arisen with the organopolysiloxane powders and the methods for their preparation heretofore known.

This invention thus provides a spherical cured product having a diameter of 5 mm or less of a polymer or polymer composition containing at least 10 wt % of linear organopolysiloxane blocks represented by the following general formula:

$$\text{---}(R_2SiO)_n\text{---} \qquad (1)$$

wherein R's are the same of different monovalent hydrocarbon groups and n is an integer of 5 or more.

This invention further provides a method for preparing a spherical cured product having a diameter of 5 mm or less of a polymer or polymer composition containing at least 10 wt % of linear oganopolysiloxane blocks represented by the following general formula (1), characterized by curing in an atomized state a curable polymer or curable polymer composition containing at least 10 wt % of the linear organopolysiloxane blocks represented by the following general formula (1):

$$\text{---}(R_2SiO)_n\text{---} \qquad (1)$$

wherein R's are the same or different monovalent hydrocarbon groups and n is an integer of 5 or more.

More particularly, the "curable polymer composition containing at least 10 wt % of linear organopolysiloxane blocks represented by the general formula (1)" means a composition which contains as a main ingredient blocks represented by the general formula (1) and which, if necessary, further contains one or more of additives such as, for example, crosslinking agent, curing catalyst, curing inhibitor, filler, pigment, heat resisting agent, sensitizer and organic solvent.

DESCRIPTION OF THE PREFERRED EMBODIMENTS

The polymer or the polymer composition according to this invention contains at least 10 wt % of linear organopolysiloxane blocks represented by the following general formula (1):

$$\text{---}(R_2SiO)_n\text{---} \qquad (1)$$

wherein R's are the same or different monovalent hydrocarbon groups and include, for example, alkyl groups such as methyl, ethyl, propyl or butyl; cycloalkyl groups such as cyclohexyl; alkenyl groups such as vinyl or allyl; aryl groups such as phenyl or xylyl; aralkyl groups such as phenylethyl; halogenated monovalent hydrocarbon groups such as γ-chloropropyl or 3,3,3-trifluoropropyl; or monovalent hydrocarbon groups having an epoxy, amino, hydroxyl, carboxyl, carboxylate ester group, acryloxy, methacryloxy or mercapto group. The above mentioned monovalent hydrocarbon groups having an epoxy group, a carboxyl group, etc. are preferable in attaining the intended object, because their presence, even in portions other than the linear diorganopolysiloxane blocks, will result in increasing in the compatibility and reactivity with the other ingredients. R's are generally in the form of a combination of methyl groups or a combination of a methyl group and one or more members of other monovalent hydrocarbon groups.

The linear organopolysiloxane blocks represented by the general formula (1) include, for example, dimethylpolysiloxane block, methylphenylpolysiloxane block, methyloctylpolysiloxane block, methylcyclohexylpolysiloxane block, methyl(α-phenylethyl)polysiloxane block, methyl(3,3,3-trifluoropropyl)polysiloxane block, dimethylsiloxane/diphenylsiloxane copolymer block, methylvinylpolysiloxane block, dimethylsiloxane/methylvinylsiloxane copolymer block, or an arbitrary combination of the these blocks.

The linear organopolysiloxane block should have a degree of polymerization of at least 5. If the degree is lower than 5, it cannot exhibit its characteristic properties to the full, and the effects explained later cannot be obtained satisfactorily. Preferably, the degree of polymerization should be at least 10, more preferably at least 20. Though its upper limit shall not particularly be limited, if it is too high, it will be difficult to obtain a fine spherical cured product by atomization. Therefore, it should desirably be lower than 1000. The linear organopolysiloxane block is required to be present in an amount of at least 10 wt %, because it cannot exhibit its characteristic properties to the full if its content is less than 10 wt %. Its content should preferably be at least 30 wt %, more preferably at least 50 wt %.

Typical examples of the curable polymer containing at least 10 wt % of linear organopolysiloxane blocks represented by the general formula (1) are curable organopolysiloxanes, block copolymers of organopolysiloxanes and organic resins, the block copolymers being curable, and mixtures of organopolysiloxanes with monomers, oligomers or polymers of organic resins, which mixtures cure while copolymerizing to form block copolymers.

As curable organopolysiloxanes are mentioned those represented by the general formula (2):

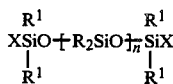  (2)

wherein X is alkenyl such as vinyl or allyl, hydroxyl, or hydrogen or other hydrolyzable group such as alkoxy, ketoxime, N,N-diorganoamino, N,N-diorganoaminoxy, N-organoamido, acyloxy or alkenyloxy, and $R^1$ is a hydrocarbon radical not having an aliphatic unsaturated bond; those represented by the general formula (3):

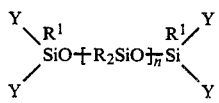  (3)

wherein Y is a hydrolyzable group such as alkoxy, ketoxime, N,N-diorganoamino, N,N-diorganoaminoxy, N-organoamido, acyloxy or alkenyloxy, and $R^1$ is as defined above; and those represented by the general formula (4) and containing linear organopolysiloxane blocks represented by the general formula (1):

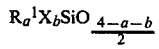  (4)

wherein $R^1$ and X are as defined above, a is a number of 0.7 to 1.9 on an average, b is a number of 0.005 to 0.4 on an average and a+b is a number of 0.7 to 1.95 on an average.

In the curable organopolysiloxanes represented by the general formula (4) and containing linear organopolysiloxane blocks represented by the general formula (1), the following are mentioned as siloxane units other than the linear organopolysiloxane blocks of the general formula (1): $R^1_3SiO_{\frac{1}{2}}$, $R^1SiO_{3/2}$, $SiO_{4/2}$, $R^1_2XSiO_{\frac{1}{2}}$, $R^1XSiO_{2/2}$, $XSiO_{3/2}$.

As organic resins in the organopolysiloxane/organic resin block copolymers are exemplified epoxy resins, polyester resins, unsaturated polyester resins, acrylic resins and polyurethane resins. The block copolymers have functional groups such as hydroxyl, alkoxy, vinyl, epoxy, acryl, methacryl and isocyanate groups.

Further, in the mixtures of organopolysiloxanes with monomers, oligomers or polymers of organic resins, which mixtures cure while copolymerizing to form block copolymers, those represented by the general formulae (2) and (3) are exemplified as organopolysiloxanes, and as organic resins are mentioned those exemplified above.

The crosslinking agents include, for example, organohydrogenpolysiloxane, organotrialkoxysilane, tetraalkoxysilane, organotriketoximesilane, organotriacetoxysilane, organotri(N,N-dialkylamino)silane, organotri(N,N-dialkylaminoxy)silane, organotri(N-alkylamide)silane, and organotri(isopropenoxy)silane. The fillers include fumed silica, precipitated silica, fine quartz powder, and diatomaceous earth. The pigments include carbon black, titanium white, titanium yellow, and red oxide. The curing catalysts included platinum compounds such as chloroplatinic acid, platinous chloride, complex salts of chloroplatinic acid and olefin and complex salts of chloroplatinic acid and divinyltetramethyldisiloxane, platinum black, diorganotin diacylate, cobalt naphthenate, and tetrabutyl orthotitanate. The heat-resisting materials include cerium hydroxide, cerium oxide, iron oxide, and fumed titanium dioxide. The sensitizers include benzophenone, and benzoin. The curing inhibitors include organic nitrogen compounds, and acetylenic alcohols. The organic solvents include toluene, xylene, and trichloroethylene. When the additives are solid, however, their particle diameters are required to be smaller enough than those of the object spherical cured product, because it will otherwise be difficult to obtain such a spherical cured product as intended.

In its principal object, this invention is intended to provide a substantially spherical product, though it shall be allowable for the product to assume somehow varied shapes such as eliptic spheres. Moreover, it may be desirable for the spherical cured product to contain voids, such as bubbles, in its particle, depending on the way of its application.

The spherical cured product of this invention has particle diameters of 5 mm or less, which could range to 0.1 micron or even smaller. The preferable particle diameters are 1 mm or less in most cases, although they may naturally vary with the way of its application. In case this product is to be incorporated in injection molding materials or in transfer molding materials, or in case it is to be used for sealing sensitive objects such as semiconductors, its particle diameters should be several tens of microns or less, lest the metal mold gate should be chocked therewith in the former use or the sealed objects be destroyed thereby in the latter.

As a method for preparing the spherical cured product in this invention, a thermosetting polymer or thermosetting polymer composition containing the linear organopolysiloxane blocks represented by the general formula (1) is atomized in a hot-air stream and cured thereby. In case the polymer or polymer composition can hardly be atomized because it is too highly viscous or because it is not liquid, it is managed to be atomized in the form of a solution or dispersion in a liquid medium such as solvent or water: As soon as the medium such as solvent or water vaporizes, the atomized matter will be hardened into a spherical solid. Though the temperature of the hot-air stream is not particularly limited, it should generally be 150° to 350° C. As another method, an energetic ray-setting polymer or a composition thereof containing the linear organopolysiloxane blocks represented by the general formula (1), is atomized in a receptacle being irradiated with high energy rays such as ultraviolet, infrared, $\gamma$ or electron rays, and cured thereby.

Moreover, an organopolysiloxane/organic resin block copolymer or a composition thereof, in place of a polymer or a composition thereof containing the linear organopolysiloxane represented by the general formula (1), may be cured in an atomized state; or a linear organopolysiloxane having a functional group may be copolymerized with a monomer, oligomer or polymer of an organic resin or with a composition thereof in an atomized state and cured thereby. Some practical examples of the curing by means of copolymerization in an atomized state are given by a combination of a diorganopolysiloxane having a functional group such as hydroxyl, alkoxy, dialkylaminoxy, amino or epoxy group, and an epoxy resin or polyester resin, or a combination of a linear organopolysiloxane having a hydrogen atom bonded to a silicon atom and a monomer, oligomer or polymer of an organic resin having a carbon-carbon double bond. For the curing reaction of a polymer or a composition thereof containing the linear organopolysiloxane blocks represented by the general formula (1), wherein the component participating in the reaction is organopolysiloxane, the curing reactions and the functional groups that are normally employed for the curing of organopolysiloxane may be used as they are. Such functional groups include, for example, silanol group, vinyl group, or allyl group; hydrogen atom bonded to a silicon atom, alkoxy group, ketoxime group, N,N-diorganoamino group, N-organoamide group, acyloxy group or alkenyloxy group; or methyl group, ethyl group, $\gamma$-aminopropyl group, $\gamma$-glycyloxypropyl group or $\gamma$-carboxypropyl group. Of these reactions, the thermosetting reactions are, for example, hydrosilylation caused in the presence of a catalyst such as platinum; condensation reactions such as dehydration, dealcoholation, deoximation, deamination, deamidation, decarboxylation, or deketonation; or radical reactions by organic peroxides.

The curing reactions by means of high-energy ray irradiation are, for example, those under the irradiation with ultraviolet rays, electron beams or $\gamma$-rays. In case the component which participate in the reaction is an organic resin, any curing reaction used normally for the curing of organic resins may be utilized.

Of these reactions, the thermosetting reactions are, for example, dehydration/condensation reactions, dealcoholation/condensation reactions, ring-opening addition reactions between the epoxy group and the hydroxyl group, silanol group, amino group or carboxyl group, addition reactions between the isocyanate group and the hydroxyl group, amino group or carboxy group, and radical reactions by organic peroxides. The curing reactions by means of high-energy ray irradiation are reactions under the irradiation with ultraviolet rays, electron beams or $\gamma$-rays. In the case of a thermosetting reaction, it is advantageous to adjust properly the temperature of the hot air stream and the retention time, so that the material be cured almost completely while it is afloat, and moreover to select properly the curing catalyst as required.

In the case of a curing reaction by means of high-energy ray irradiation, it is advantageous to adjust properly the dose of the rays and the retention time, so that the material be cured almost completely while it is afloat, and to select properly the sensitizer as required.

According to the method of this invention to produce a cured product in an atomized state, it is possible not only to produce spherical cured products ranging from microspheres of tens to several hundreds of millimicrons to larger spheres of tens to several hundreds of microns in particle diameters, but also to produce those of further larger particle diameters if the material polymer is properly controlled for its molecular weight and viscosity. The equipment needed for the practice of the method of this invention include, for example, a spray dryer using hot-air stream and a spray-reaction equipment for internal irradiation of high-energy rays.

The spherical cured product of a polymer or polymer composition containing the organopolysiloxane blocks in this invention is sparingly cohesive and characterized by being dispersed readily even if it becomes somehow coagulated at first. As it is spherical, it is characterized by rolling easily and undergoing little friction; as it has a rubber elasticity, it is further characterized by undergoing no deformation or concentrated stress under extreme pressure, so that it is hardly cracked. The smaller the particle diameter, the greater these effects become, and the product will thus exhibit a superior solid lubricating action. Moreover, being spherical and ready for dispersion, it has another advantage of being miscible readily with other materials. Moreover, the present product has an effect of elevating the fluidity of various molding materials containing solid additives such as inorganic fillers. On application to such molding materials, it is capable of improving their workability or increasing the quantity of the fillers added, with their original workability maintained. Moreover, it is effective in improving their thermal expansion coefficient and dimensional stability. Furthermore, if it is in the form of especially fine particles, it can impart suitable thixotropic properties to liquid materials.

The present product has a rubber elasticity and is readily compressed by external pressure. When it is incorporated in other materials, therefore, it can control their thermal expansion, improve their dimensional stability or reduce their molding shrinkage or the stress applied due to a temperature change or an external stress.

The spherical cured product of a polymer or polymer composition containing the organopolysiloxane blocks in this invention, wherein the polymer consists exclusively of silicone, will effectively introduce to other various materials the intrinsic properties of silicone, such as its excellent heat resistance, cold resistance, mold release characteristics, water repellency, shock resistance, flame retardancy, weathering resistance and electrical characteristics. Moreover, its application to medical use will pose no problem, because it is inert to a living body.

When the present product, having relatively large particle diameters of several hundred microns or more, is mixed in a painting material, its particles contained in the coating will exhibit an excellent mold release action, whereby it may also be possible to expect an effect of preventing posters from being stuck at random. Moreover, organopolysiloxane, depending on the kind of the organic groups contained, is capable of controlling the refractive index of light to some extent. In this sense, the present product may also be used for producing such effects as the scattering or reflection of light, if the refractive index is selected properly and the fact that its particles are spherical is utilized.

In its application, the powder of the spherical cured product of a polymer or polymer composition containing organopolysiloxane in this invention is used by itself in some cases or in combination with other materials in some other cases. The spherical cured product of this invention may otherwise be used after its surface has been treated with other materials or after its inside has been dispersed with other materials. Of course, it is also possible to previously mix such materials in the procedure of producing spherical particles. These treatments make it possible to control the surface characteristics of the particles and their affinity with the object in which they are to be incorporated, and moreover to realize various effects which may be expected by the fact that the substances dispersed or mixed inside the particles will ooze out to the particle surface.

The objects to which the spherical cured product powder containing organopolysiloxane in this invention is applicable are given by the following examples, but of course they shall not be limited to these examples.

These objects include solid lubricant, water repellent, mold release material, anti-tack agent, grease, oil, cement, plaster, coating material, casting material, molding material, film, and agricultural and pharmaceutical preparations. The high-molecular materials in which the present product can be incorporated include, for example, natural rubber, polychloroprene rubber, polybutadiene rubber, SBR, EPR, EPT, polyisoprene rubber, polyisobutene rubber, polyacrylate rubber, polyurethane rubber, butadiene/acrylonitrile copolymer rubber, polyester rubber, polysulfide rubber, fluororubber, silicone rubber, or a copolymer of these rubbers, or a mixture of these rubbers. The resin materials include, for example, various polyamides represented by aromatic polyamides such as nylon-5, nylon-6, nylon-7, nylon-8, nylon-9, nylon-10, nylon-11, nylon-12, nylon-6,6 and kevlar; saturated polyesters represented by polyethylene terephthalate, polybutylene terephthalate, hydrogenated polyxylene terephthalate, polycaprolactone, and polypivalolactone; polycarbonate, ABS, AS, polystyrene, polyethylene, polypropylene, polybutadiene, polyvinyl chloride, polyvinylidene chloride, polyacrylonitrile, polyvinyl alcohol, polyvinyl acetate, polyvinyl butyral, polymethyl methacrylate, fluororesins, and other polyolefin resins; polyethers such as polyethylene glycol, polypropylene glycol, polytetrahydrofuran, penton, polyphenylene oxide, and polyacetal; various thermoplastic and thermosetting resins such as phenolic resin, polyurethane resin, acrylic resin, urea resin, unsaturated polyester, melamine resin, phthalate resin, BT resin, polyimide resin, silicone resin, celluloid, acetylcellulose, epoxyacrylate, polyacrylates, and epoxy resin; resins cured by the irradiation with high-energy rays such as ultraviolet, $\gamma$- or electron rays; block or random copolymers or blends thereof. Of course, these resins may contain various powdery inorganic fillers, glass fibers, carbon fibers, other fibrous fillers or reinforcing materials, heat resistance improver, weathering resistance improver, other stabilizers, modifiers, pigments, dyestuff, etc.

This invention will be illustrated by the following examples. However, the scope of this invention shall not be limited to these examples. In the examples, "parts" means "parts by weight."

EXAMPLE 1

A mixture consisting of 100 parts of dimethylpolysiloxane represented by the average compositional formula $$CH_2=CH(CH_3)_2SiO[(CH_3)_2SiO]_m-Si(CH_3)_2CH=CH_2 \ (m=100)$$

having vinyl groups on both ends, 2 parts of methylhydrogenpolysiloxane represented by the average compositional formula $$(CH_3)_3SiO[(CH_3)HSiO]_{30}Si(CH_3)_3$$

an isopropyl alcohol solution of chloroplatinic acid in a weight corresponding to 10 ppm based on platinum for the total amount of the above-mentioned polysiloxane, and 0.1 part of 3-methyl-1-butyn-3-ol, was atomized in a spray dryer, 2 m in diameter and 4 m in height, through a rotary nozzle, whereby a cured product was obtained in the powdery form at a rate of 50 kg/hour. The temperature of the hot air stream was 230° C. at the inlet of the spray dryer. The cured product was collected by a cyclone. It consisted of spherical rubber, 2 to 30 microns in diameter, when observed under a scanning electron microscope. This spherical rubber powder was in the form of a weakly coagulated mass having diameters of 3 mm or less, which was easily divided into primary particles by weak shear force. This spherical rubber powder, when ground between two aluminum plates, showed a very good lubricating property. Moreover, when this spherical rubber powder was spread over the surface of butyl rubber, the butyl rubber lost its intrinsic tackiness and became easy to handle.

EXAMPLE 2

A cured product was obtained in the same manner as in Example 1, except that the dimethylpolysiloxane in Example 1 was replaced by dimethylpolysiloxane with m=300 and that a one-fluid nozzle was used. The product was spherical rubber having diameters of 300 microns to 3 mm.

EXAMPLE 3

A cured rubber was obtained in all the same manner as in Example 1, except that the dimethylpolysiloxane in Example 1 was replaced by 100 parts of dimethylpolysiloxane (m=50) with two dimethylvinylsilyl-blocked end groups, that the same methylhydrogenpolysiloxane as in Example 1 was used by 5 parts, and that a two-fluid nozzle was used. The cured powder was collected by the use of a cyclone and a bag filter. The product from the cyclone was spherical rubber, 0.5 to 10 microns in diameter, when observed under a scanning electron microscope. The product from the bag filter was spherical rubber, 0.1 to 1 micron in diameter. These spherical rubber powders were in the form of weakly coagulated masses, 3 mm or less in diameter. When ground between two glass plates, they were readily divided into primary particles, which showed a very good lubricating property.

EXAMPLE 4

A mixture of 100 parts of dimethylpolysiloxane containing vinyl groups represented by the average compositional formula

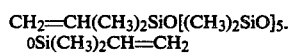

and 0.5 part of benzophenone was dissolved with heating, and then 5 parts of methylhydrogenpolysiloxane represented by the average compositional formula

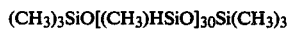

was added to the solution. The resulting mixture was sprayed into a quartz tube from its lower end which was provided close to a high-pressure mercury vapor lamp having the main wavelength of 365 nm, output 120 W/cm and tube length 40 cm. A cured powder coming out of the quartz tube top was collected. The product was spherical rubber, 0.5 to 20 microns in diameter, when observed under a scanning electron microscope. This spherical rubber powder was in the form of a weakly coagulated mass having diameters of 3 mm or less. When ground between two glass plates, they were readily divided into primary particles, which showed a very good lubricating property. Moreover, when this spherical rubber powder was spread over the surface of butyl rubber, the butyl rubber lost its intrinsic tackiness and became easy of handling.

EXAMPLE 5

1 part of lead naphthenate was added to 100 parts of a silicone resin which was a block copolymer consisting of 5 mol % of $CH_3SiO_{1.5}$ units, 45 mol % of $C_6H_5SiO_{1.5}$ units, 45 mol % of $SiO$ units and 5 mol % of $C_6H_5(CH_3)SiO$ units and containing $(CH_3)_2SiO$ units in the form of a linear polymer represented by the average compositional formula of $[(CH_3)_2SiO]_{50}$, wherein the content of the hydroxyl groups bonded to silicon atoms was 1 wt %. The mixture was dissolved with the addition of 40 parts of toluene by heating at 80° C. The resulting solution was atomized in a spray dryer at a temperature of 270° C. at the inlet of the hot air stream, through a two-fluid nozzle, whereby the toluene was instantaneously evaporated, so that the silicone resin was simultaneously hardened to give a cured powder. The product consisted of spherical particles, 1 to 30 microns in diameter. This particle, when pressed between two glass plates under a stereographic microscope, was found to have its diameter extended, and it was confirmed that the particle had a rubber elasticity. Moreover, it showed a very good lubricating property when ground between two glass plates.

EXAMPLE 6

80 parts of a liquid epoxy resin represented by the following structural formula

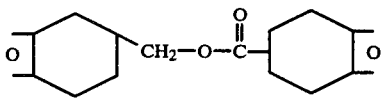

(commercial name Chissonox 221, a product of the Chisso Co., Ltd.) was mixed with 30 parts of a linear dimethylpolysiloxane represented by the average compositional formula

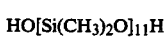

30 parts of an acid anhydride QH 2000 (commercial name, a product of the Dai-Nippon Ink Co., Ltd.) and 2 parts of aluminum benzoate in the form of a fine powder, and the uniform mixture was atomized in a spray dryer at a temperature of 280° C. at the inlet of hot air stream. The resulting cured product consisted of spherical particles, 1 to 50 microns in diameter. This epherical particle was confirmed to have a rubber elasticity from the finding that it had its diameter extended when it was pressed between two glass plate under a stereographic microscope. This particle showed a good lubricating property when it was ground between two stainless steel plates.

EXAMPLE 7

A mixture consisting of 100 parts of methylphenylpolysiloxane represented by the average compositional formula

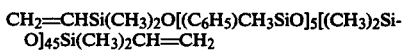

and 4 parts of aerogel was passed through a triple roll. 100 parts of this mixture was mixed with 5 parts of methylhydrogenpolysiloxane represented by the average compositional formula

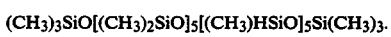

To this mixture were further added an isopropyl alcohol solution of chloroplatinic acid in an amount equivalent to 100 ppm based on platinum and 0.1 part of 3-methyl-1-butyn-3-ol. The resulting mixture was atomized in a spray dryer through a two-fluid nozzle to give a cured product. The temperature of hot air stream at the inlet of the spray dryer was 250° C. The cured powder collected by a cyclone consisted of spherical rubber particles, 1 to 20 microns in diameter. This powder exhibited a very good lubricating effect when it was applied to a ground-glass stopper. However, the same ground-glass stopper without coating with this powder did not work well.

EXAMPLE 8

100 parts of methylvinylpolysiloxane represented by the average compositional formula

was mixed with 10 parts of fumed silica, 130 m²/g in BET surface area, which had been rendered hydrophobic by treatment with dimethyldichlorosilane, and 3.0 parts of pasty 2,4-dichlorobenzoyl peroxide having a purity of 50 wt %. The resulting mixture was atomized in a spray dryer, 2 m in diameter and 4 m in height, through a rotary nozzle, to give a cured powder at a rate of 43 kg/hour. The temperature of hot air stream at the inlet of the spray dryer was 300° C. The cured powder which was collected by a cyclone consisting of spherical rubber particles, 1 to 30 microns in diameter, when observed under a scanning electron microscope. This spherical rubber powder was in the form of weakly coagulated masses, 2.5 mm or less. When ground between glass plates, however, they were readily divided into primary particles, and showed a very good lubricating property.

EXAMPLE 9

100 parts of dimethylpolysiloxane with two silanol-blocked end groups (average degree of polymerization: 400) was mixed with 20 parts of wet-processed silica having a specific surface area of 240 m²/g according to the BET method and 4 parts of hexamethyldisilazane. The mixture was heated with stirring and then cooled to room temperature. It was subsequently mixed with 10 parts of vinyl-tri(methyl ethyl ketoxime)silane and 40 parts of hexane in a dehumidified atmosphere to give a fluid composition. This composition was atomized in a spray dryer, 2 m in diameter and 6 m in height, through a two-fluid nozzle, to give a cured powder at a rate of 32 kg/hour. The combustion gas stream of the propane gas used for the spray dryer had a temperature of 270° C. at the inlet. The cured product, which was collected by a cyclone, was spherical rubber, 0.5 to 1 micron in diameter, when it was observed under a scanning electron microscope. This pherical rubber powder was in the form of weakly coagulated masses, 3 mm or less in diameter, which were divided into primary particles only by gentle rubbing with fingers. When this spherical rubber powder was ground between methacrylate resin plates, it exhibited a good lubricating property, with no damage occurring at all in the methacrylic resin plates. Moreover, when an asphalt surface was spread with this spherical rubber powder, wrapping paper could no longer stick on it.

EXAMPLE 10

100 parts of dimethylpolysiloxane with two dimethoxymethylsiloxy-blocked end groups (average degree of polymerization: 400) was mixed with 10 parts of dryprocessed silica, 200 m²/g in specific surface area according to the BET method, which had been rendered hydrophobic by treatment with hexamethyldisilazane, 2.0 parts of tetrabutyl titanate and 40 parts of hexane in a dehumidified atmosphere to give a fluid composition. This composition was atomized in a spray dryer 2 m in diameter and 6 m in height through a two-fluid nozzle to give a cured powder at a rate of 30 kg/hour. The combustion gas stream of the propane gas used for the spray dryer had a temperature of 270° C. at the inlet. The cured product, which was collected by a cyclone, was found to be a spherical rubber 0.7 to 15 microns in diameter when observed under a scanning electron microscope. This spherical rubber powder exhibited the same behavior as that in Example 9.

COMPARATIVE EXAMPLE

The same composition as the one prepared in Example was retained in the original vessel, rather than being transferred to a spray dryer for atomization; it was cured in situ at 150° C. for one hour to give a rubbery product. This cured product was ground in a mortar to give a powder, 60 to 250 microns in particle diameter. However, it was found impossible to grind them further into finer particles in the mortar. An observation under a scanning electron microscope revealed that these particles had various shapes and that none of them were spherical. Moreover, it was also impossible to grind them into finer particles in a ball mill, because they would rather be coagulated into masses in vein. It was extremely difficult to classify through sieves the products ground by the mortar and ball mill. In fact, the sieving was narrowly carried on with the help of a spatula and was quite inefficient.

What is claimed is:

1. A method for preparing a spherical cured product having a diameter of 5 mm or less comprising curing, in an atomized state, a curable material selected from the group consisting of a curable polymer containing at least 10 weight percent of linear organopolysiloxane blocks having the structural formula

wherein R's are the same or different and are monovalant hydrocarbon groups; and n is an integer of 5 or more; and a curable polymer composition, said composition including said curable Polymer.

2. A method as set forth in claim 1, wherein the curable organopolysiloxane is organopolysiloxane heat curable.

3. A method as set forth in claim 1 wherein said curable polymer is a curable organopolysiloxane and said curable organopolysiloxane composition is a curable organopolysiloxane composition.

4. A method as set forth in claim 3 wherein the curing reaction is a reaction selected from the group consisting of hydrosilylation, dehydration, deoximation and radical reaction by an organic peroxide.

5. A method as set forth in claim 3 wherein the curable organopolysiloxane is cured using irradiation with high-energy rays.

6. A method as set forth in claim 5, wherein the high-energy rays are ultraviolet rays.

7. A method as set forth in claim 1 wherein the curable polymer is a curable organopolysiloxane/organic resin block copolymer.

8. A method as set forth in claim 7, wherein the organic resin is an epoxy resin.

9. A method as set forth in claim 8 wherein the organopolysiloxane/epoxy resin is cured by a ring-opening addition of said epoxy resin.

10. A method as set forth in claim 1 wherein the curable material is atomized after being dissolved or dispersed in a liquid medium.

11. A method as set forth in claim 1 wherein the curable polymer is a mixture of said organopolysiloxane and a monomer, oligomer or polymer of an organic resin, said polymer characterized by curing while copolymerizing to form a block copolymer.

* * * * *